US007961136B2

(12) United States Patent
Stefani et al.

(10) Patent No.: US 7,961,136 B2
(45) Date of Patent: Jun. 14, 2011

(54) AUTOMATIC DEPENDENT SURVEILLANCE-BROADCAST (ADS-B) NETWORK INFRASTRUCTURE, GROUND STATION AND SITUATION DISPLAY SOFTWARE DEPLOYMENT AND EVALUATION ACTIVITY

(75) Inventors: Rolf R. Stefani, West River, MD (US); James Gary Cooper, Jr., Annapolis, MD (US)

(73) Assignee: Arinc Incorporated, Annapolis, MD (US)

( * ) Notice: Subject to any disclaimer, the term of this patent is extended or adjusted under 35 U.S.C. 154(b) by 203 days.

(21) Appl. No.: 12/421,219

(22) Filed: Apr. 9, 2009

(65) Prior Publication Data

US 2010/0103022 A1 Apr. 29, 2010

Related U.S. Application Data

(60) Provisional application No. 61/108,193, filed on Oct. 24, 2008.

(51) Int. Cl.
*G01S 13/00* (2006.01)

(52) U.S. Cl. ............................... 342/36; 342/33; 342/30

(58) Field of Classification Search ..................... 342/30
See application file for complete search history.

(56) References Cited

U.S. PATENT DOCUMENTS

| | | | | |
|---|---|---|---|---|
| 6,295,294 | B1 * | 9/2001 | Odlyzko | 370/389 |
| 2008/0191942 | A1 * | 8/2008 | Smith et al. | 342/456 |
| 2008/0267386 | A1 * | 10/2008 | Cooper | 379/265.06 |
| 2009/0219197 | A1 * | 9/2009 | Bunch | 342/26 B |
| 2010/0090891 | A1 * | 4/2010 | Donovan | 342/357.07 |

* cited by examiner

*Primary Examiner* — Thomas H Tarcza
*Assistant Examiner* — Timothy A Brainard
(74) *Attorney, Agent, or Firm* — Ronald E. Prass, Jr.; Prass LLP

(57) ABSTRACT

A method and system that receives and processes ADS-B data from one or more aircraft is disclosed. The system may include one or more ground stations that receives data from one or more aircraft and converts the received aircraft ADS-B data to XML format, determines the lowest cost communication mode available, and transmits the XML data over TCP/IP to an aircraft data server. The aircraft data server receives the aircraft ADS-B data in XML format from the one or more ground stations, processes the received ADS-B data to extract aircraft data and eliminate duplicate aircraft data; determines aircraft data missing from the processed aircraft data, receives supplemental aircraft data from other sources to provide aircraft data missing from the processed aircraft data, and outputs the processed aircraft data and the received supplemental aircraft data to one or more processing devices for processing and display.

20 Claims, 6 Drawing Sheets

AUTOMATIC DEPENDENT SURVEILLANCE-BROADCAST (ADS-B) NETWORK INFRASTRUCTURE, GROUND STATION AND SITUATION DISPLAY SOFTWARE DEPLOYMENT AND EVALUATION ACTIVITY

PRIORITY INFORMATION

This non-provisional application claims priority from U.S. Provisional Application Ser. No. 61/108,193, filed Oct. 24, 2008, the content of which is incorporated herein by reference in its entirety.

BACKGROUND OF THE DISCLOSURE

1. Field of the Disclosure

The disclosure relates to data link communications from aircraft.

2. Introduction

An Automatic Dependent Surveillance-Broadcast (ADS-B) equipped aircraft determines its own position using a global navigation satellite system and periodically broadcasts this position and other relevant information to potential ground stations and other aircraft with ADS-B-in equipment. ADS-B can be used over several different data link technologies, including Mode-S Extended Squitter (1090 ES), VHF data link (vDL Mode 4), and Universal Access Transceivers (UAT).

ADS-B provides accurate information and frequent updates to airspace users and controllers, and hence supports improved use of airspace, reduced ceiling/visibility restrictions, improved surface surveillance, and enhanced safety, for example through conflict management.

Under ADS-B, an aircraft periodically broadcasts its own state vector and other information without knowing what other vehicles or entities might be receiving it, and without expectation of an acknowledgment or reply. ADS-B is automatic in the sense that no pilot or controller action is required for the information to be issued. It is dependent surveillance in the sense that the surveillance-type information so obtained depends on the suitable navigation and broadcast capability in the source aircraft.

There is a growing international consensus that ADS-B will become the cornerstone technology of the next-generation air traffic management (ATM) systems. This is primarily due to the substantial cost benefits and technical advantages over current radar systems. The lower cost differential of building and maintaining current radar systems and the other tangible benefits accrued directly to Air Traffic Control (ATC) providers is driving significant investment in ADS-B implementation activity in the global aviation arena.

ADS-B is viewed by the FAA, NavCanada, AirServices Australia, Eurocontrol and other global ATM organizations as the single unifying ATM system of the future. While initial trials of ADS-B deployment occurred in areas with limited primary radar coverage, it is envisioned that within 10-15 years, ADS-B will supplement, if not totally replace primary radar functionality. Moreover, it is highly likely that secondary radar will be maintained as a backup capability. It is critically imperative that the standards being developed are harmonized in concert amongst all ATM organizations worldwide.

Other implications in attempting to further the implementation of any national ADS-B capability are that CAA/ATM organizations need to negotiate standards within their internal constituencies (ATC users), as well as with external constituencies (Airlines and Airports) somewhat simultaneously. Other users, particularly airlines, need to be part of the equation as they are required to be equipped in order to achieve the overall benefit.

One of the major obstacles to implementing a national ADS-B system has been the reluctance of some airlines to equip older aircraft with ADS-B avionics as these airlines do not see a great benefit or return on their investment. A case in point is the NavCanada implementation in the Hudson Bay non-radar airspace that underwent a process of obtaining airline buy-in and developed a business case for ADS-B/Out Only as compared to radar. The outcome of the business case analysis was an estimated $200M in fuel savings alone due to reduced separation minimums and other routing advantages. Operational benefits generated by controller operations (reduced communication work load, less time providing IFR separation etc.) were not reported to be part of the benefit calculation.

It is universally felt that the primary benefits of ADS-B are focused on ATC for separation, but there are many other benefits that can be obtained by both ATC providers and other airspace users—namely airlines and airports. This is clearly evident by observing the growing demand for products and services that assist airline and airport customers in flight following and tracking. Many products rely on real-time aircraft positional information that is not currently available in the continental USA. Additionally, ADS-B can also provide a capability to augment airport surface tracking in some environments to automatically generate block time and OOOI messages in a non-ACARS capable/equipped areas. These messages have been proven to lower airline operating costs and improve efficiency and are highly desired by the customer base.

SUMMARY OF THE DISCLOSURE

A method and system that receives and processes ADS-B data from one or more aircraft is disclosed. The system may include one or more ground stations that receives data from one or more aircraft and converts the received aircraft ADS-B data to XML (Extensible Markup Language) format for transmission over TCP/IP, determines the lowest cost communication mode available, and transmits the XML data to an aircraft data server. The aircraft data server receives the aircraft ADS-B data in an XML format over TCP/IP from the one or more ground stations, processes the received ADS-B data to extract aircraft data and eliminate duplicate aircraft data; determines aircraft data missing from the processed aircraft data, receives supplemental aircraft data from other sources to provide aircraft data missing from the processed aircraft data, and outputs the processed aircraft data and the received supplemental aircraft data to one or more processing devices for processing and display.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Figure 1:
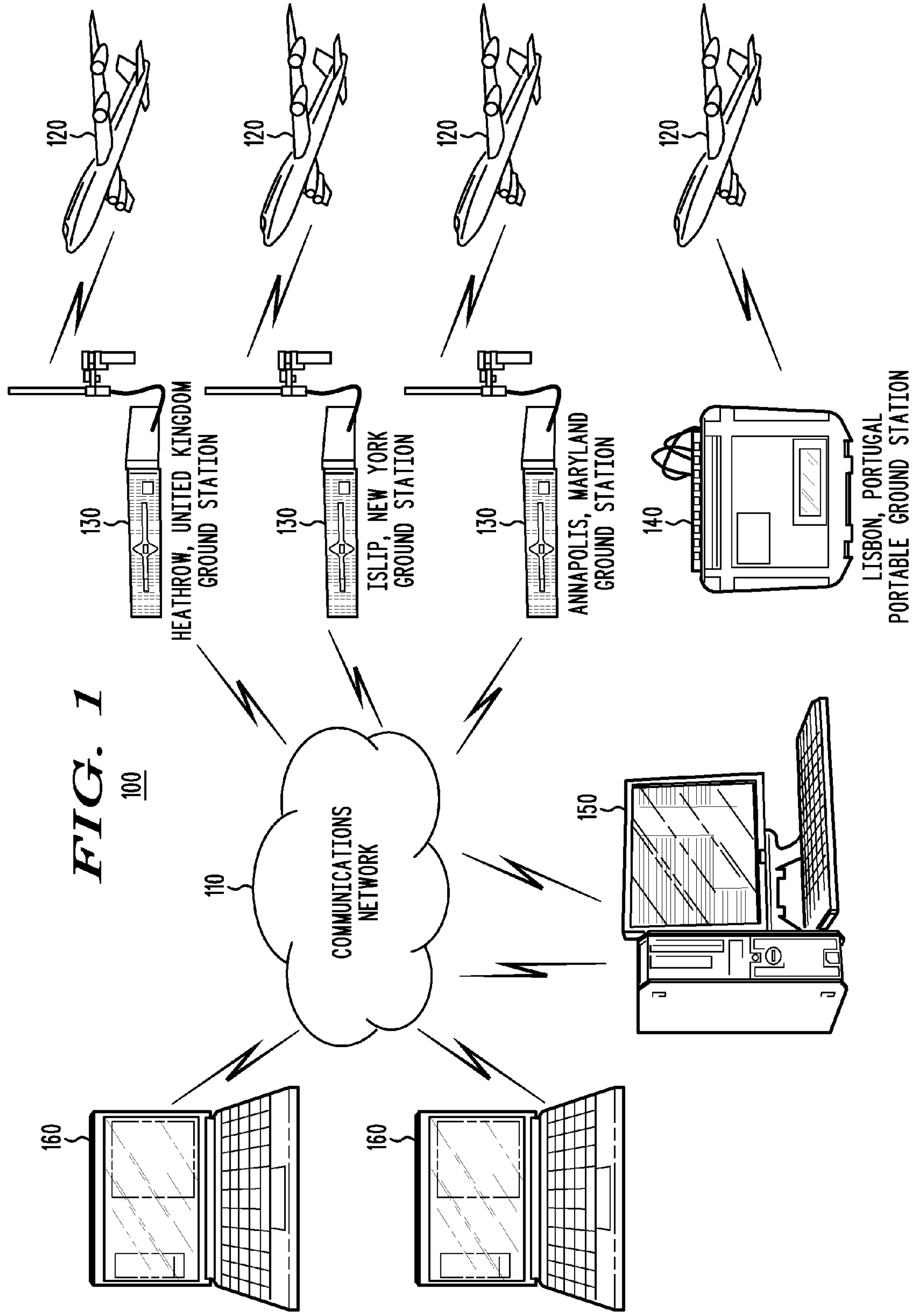
FIG. 1 is an exemplary diagram of an aircraft data system in accordance with a possible embodiment of the disclosure.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure. The disclosed embodiments may concern Automatic Dependent Surveillance-Broadcast (ADS-B) Network Infrastructure, Ground Station And Situation Display Software Deployment And Evaluation Activity. In order to be responsive to customers' needs for reliable and cost effective tracking of their aircraft fleets, the disclosed embodiments concern the development of a complete turn-key "low cost" ADS-B solution. Based on commercial (COTS) equipment and customized software/processes, the disclosed embodiments disclose a system and method that may allow users to acquire ADS-B-generated information, monitor the ADS-B receiver network and graphically display the real time position of tracks and other flight information. Though not currently certified as required for use in providing ATC separation, this system and method may provide many of the basic benefits of ADS-B for a small fraction of the traditional cost.

The components of the ADS-B system and method discussed herein may include:

1) Low cost ADS-B receiver ground stations that are accommodated in a single 1 U/19 inch rack mount chassis, or portable enclosure and a 1090 MHz (or 978 MHz) antenna,
2) The communications backbone and ADS-B track collector CPU/Server, and
3) A Graphical User Interface (GUI) based graphical flight tracking application that provides for near real time geo display and situational awareness of tracked aircraft.

Existing Aircraft Communications Addressing and Reporting System (ACARS) ground stations (over 1,000) may be utilized to house the ADS-B receivers and the existing global communications network where available and feasible, a dedicated ADS-B aircraft data collection system may then be provided to connect to ground stations virtually anywhere in the world. The users of related display software are able to connect to our the collector/server and are able to passively monitor all ADS-B traffic on all ground stations or specific traffic as filtered (using known filtering algorithms) when necessary.

The notion is that providing selected segments of the addressable ADS-B market (e.g. airlines) with this low cost alternative, a compelling cost-benefit and business model could be developed to assist justifying an airlines investment in ADS-B avionics. In addition, deployment of ADS-B may enable bundling of other services, and may provide a new user interface for sending and receiving ACARS messages as an overlay to the ADS-B situation display.

The lack of an integrated approach to ADS-B across the world or an approach that fails to address all user requirements (CAA, Airlines & Airports) are factors that could contribute to delays in conventional ADS-B deployment. These likely delays, beyond the already long time lines expected, offer an exciting opportunity to exploit low cost interim solutions such as in the disclosed embodiments to achieve some immediate benefits and gain necessary knowledge and understanding.

An ADS-B System and Service may include the following components:

- Installation of an ADS-B ground station and antenna on customer premises.
- Installation and training of ADS-B GUI-based Situational Display software on customer supplied PC (appropriate configuration)
- Delivery of the ADS-B data stream to a Customer's premises from a pre-defined set of ADS-B receivers via a TCP/IP connection(s)
- A service level commitment
- A total communications management system 24 hours—Seven days per week (24/7)
- Network availability will be to the performance standard agreed upon
- Customer access to 24/7 Help Desk support
- Dedicated Customer Support
- A service advisory system to ensure that Customers are notified of planned outages, service failures and predicted system restoration times
- Delivery of monthly performance reports
- Participation in a web based user group forum to discuss and document ideas and issues etc.
- Collaboration in documenting and presenting to appropriate organizations A system and method may include receiving ADS-B information from one or more aircraft and processing the received ADS-B information to obtain aircraft parameters. The aircraft parameters may include type of aircraft, aircraft identification information, origination and destination information, location information, altitude information, estimated time of arrival information, departure information, and other aircraft related information. The obtained aircraft parameters may be set to a display to be displayed in "real time" or near-real time to a user. The system and method may be provided in as a single ADS-B receiver and processing device or as multiple devices. The system and method may operate passively so no transmissions may be necessary. The system may also be operative in conjunction with ACARS and an Integrated Air-Ground (IAG) station to provide greater information capability concerning aircraft.

FIG. 1 illustrates an exemplary diagram of an aircraft data system 100 in accordance with a possible embodiment of the disclosure. The aircraft data system 100 may include an a communication network 110, one or more aircraft 120, one or more ground stations 130, one or more portable ground stations 140, an aircraft data server 150, and one or more user terminals 160. The communications network 110 may represent any type communication network that may send and receive communications, such as a military communication network, a secure government communication network, a satellite communication network, a cellular data network, a cable communication network, the Internet, an intranet, a local area network, etc., for example. The communications network 110 may be a network that communicates with a limited type of communications or it may be a network that communicates with any number of known communication types and devices, ground stations 130, 140, satellites, radio towers, aircraft radio and data equipment, telephones, computers, servers, etc.

The aircraft 120 may contain and operate a plurality of communication radios and devices, such as VHF radios, data link systems, transponders, ACARS systems, ADS-B transmission systems, etc. The aircraft 120 may represent any type of commercial, private, cargo, or military aircraft. The term aircraft may be defined as any apparatus that may fly, such as an airplane, helicopter, unmanned vehicle, blimp, balloon, etc., for example.

The ADS-B transmission system may be integrated with the aircraft's avionics, such as positional, navigation, time, attitude, and altitude devices, for example. The ADS-B transmission system may also be integrated with the aircraft's existing communication devices, such as radios, radars, antennae 130, etc., for example.

The ground station 130 may be any computer, server, and processing device that may be able to receive ADS-B information from one or more aircraft 120, convert the received ADS-B information to aircraft data that may transmitted in XML format to an aircraft data server 150. The ground station 130 may include a communications receiver that may be able to receive ADS-B information on any frequency broadcast by one or more aircraft, including 1090 MHz or 978 MHz, for example. The ground station 130 may be a single box with an antenna that may be stand alone or rack mounted in a ground station facility, for example. The portable ground station 140 represent a ground station that may contain the same or similar components as the ground station 130 but may be moved from location to location for military and civilian purposes, for example. The possible components of an exemplary ground station 130, 140 will be discussed in relation to FIG. 2, below.

The aircraft data may include date and time, call sign, latitude, longitude, altitude, airspeed, status, registration number, vertical rate, track, ground speed, or transponder mode (e.g., Mode S) and code, for example.

Figure 6:
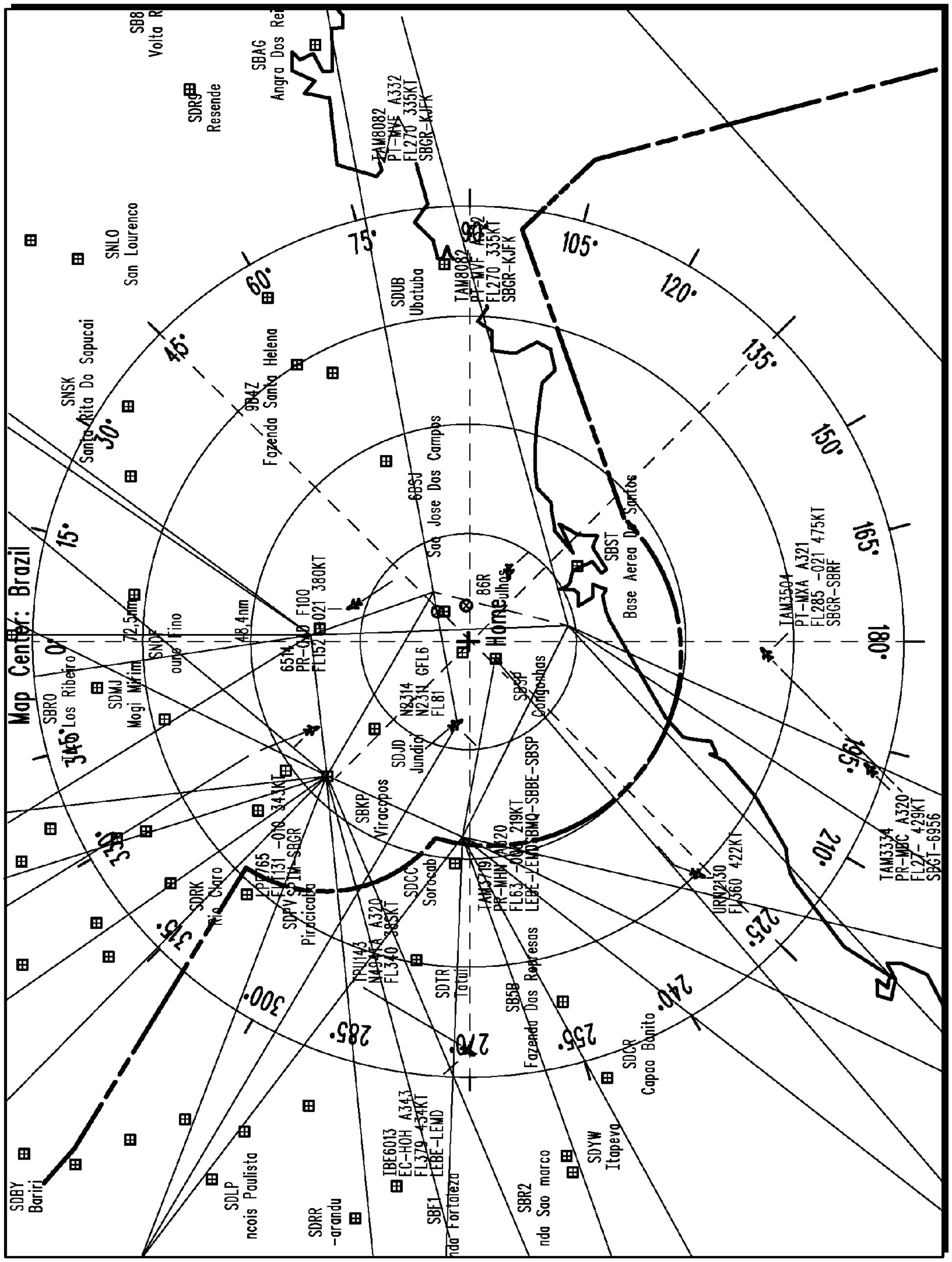
FIG. 6 is an exemplary diagram of a possible graphical display of aircraft data derived from received ADS-B data in accordance with a possible embodiment of the disclosure.

The aircraft data server 150 may be any server, computer, personal computer, portable computer, or personal digital assistant that may receive and process aircraft data from one or more ground station 130, 140 through a communications network 110. The aircraft data server 150 may also be able to receive supplemental aircraft data that may be missing from the received ADS-B data sent from the ground stations 130, 140. The aircraft data server 150 may also include display processing and formatting capabilities to be able to display aircraft data to users in a graphical and/or tabular format. An example of such a graphical display of aircraft data that may be derived from received ADS-B data is shown in FIG. 6.

User terminals 160 may be any remote or local terminals that may be able to display tabular and/or graphical aircraft data derived from ADS-B data received by ground stations 130, 140 and any supplemental aircraft data received by the aircraft data server 150.

Figure 2:
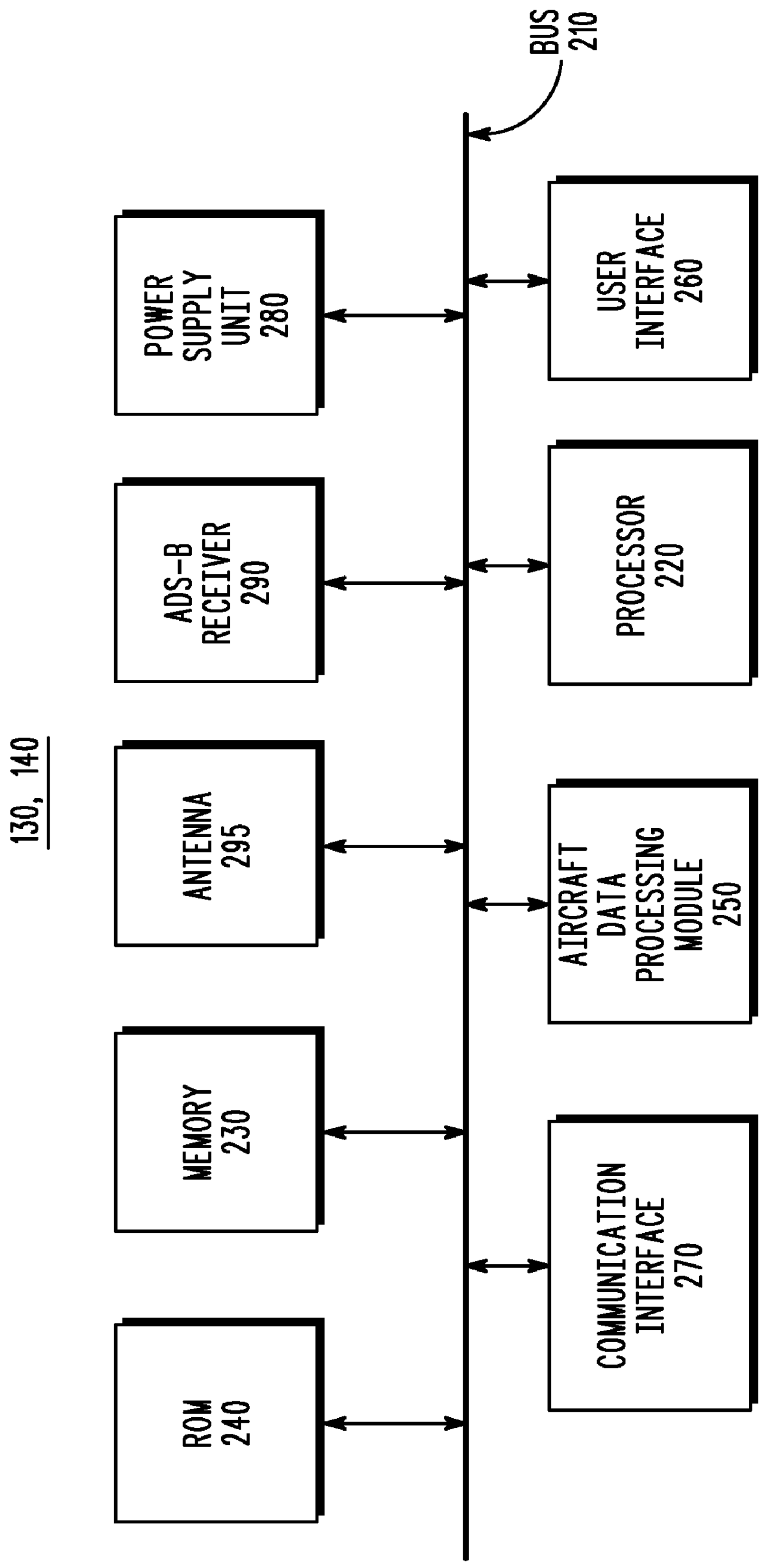
FIG. 2 is an exemplary block diagram of possible ground station in accordance with a possible embodiment of the disclosure.

FIG. 2 illustrates an exemplary block diagram of the ground station 130, 140 in accordance with a possible embodiment of the disclosure. The ground station 130, 140 may include bus 210, processor 220, memory 230, read only memory (ROM 240, aircraft data processing module 250, user interface 260, communication interface 270, power supply unit 280, ADS-B receiver 290, and antenna 295.

Bus 210 may permit communication among the components of the ground station 130, 140. Processor 220 may include at least one conventional processor or microprocessor that interprets and executes instructions. Memory 230 may be a random access memory (RAM or another type of dynamic storage device that stores information and instructions for execution by processor 220.

Communication interface 270 may include any mechanism that facilitates communication via the communications network 110. For example, communication interface 270 may include a modem. Alternatively, communication interface 270 may include other mechanisms for assisting in communications with other devices and/or systems.

ROM 240 may include a conventional ROM device or another type of static storage device that stores static information and instructions for processor 220. A storage device may augment the ROM 240 and may include any type of storage media, such as, for example, magnetic or optical recording media and its corresponding drive.

User interface 260 may include one or more conventional input mechanisms that permit a user to input information, communicate with the ground station 130, 140, and/or present information to the user, such as a an electronic display, microphone, touchpad, keypad, keyboard, mouse, pen, stylus, voice recognition device, buttons, one or more speakers, etc.

Power supply unit 280 may enable the ground station 130 to be powered by primary AC power (possible DC power backup) and the portable ground station 140 to be powered by both AC and DC power. The power supply unit 280 may be connected to the aircraft in such a manner to receive AC power by using any known connection method, such as an umbilical, cords, harness, cables, etc., for example. The portable ground station 140 may include one or more built-in or detachable batteries for remote operations which may be charged using any possible power method including AC charging ports, solar power, etc.

The ground station 130 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 270.

The ADS-B receiver 290 may represent any radio or component that may be able to receive ADS-B transmissions from aircraft. The ADS-B receiver 290 may be a simple and inexpensive ADS-B receive-only receiver that may receive ADS-B communications on any ADS-B frequency, such as 1090 MHz and 978 MHz, for example. ADS-B transmission capability may not be included in ground station 130, 140 as transmission capabilities would increase the size and expense of the ground station 130, 140 and is not required for operating the aircraft data system 100 according to disclosed embodiments.

The ground station 130, 140 may include one or more antenna to facilitate communications in a particular communications mode. For example, the ground station 130, 140 may include a WiFi antenna for communicating with a WiFi network, and a cellular antenna for communications with a cellular network, a VHF antenna for communicating with aircraft radio and ACARS equipment, etc. for example.

For illustrative purposes, the functions of aircraft data processing module 250 and the aircraft data collection process may be described below in FIG. 4 in relation to the diagrams shown in FIGS. 1 and 2.

Figure 3:
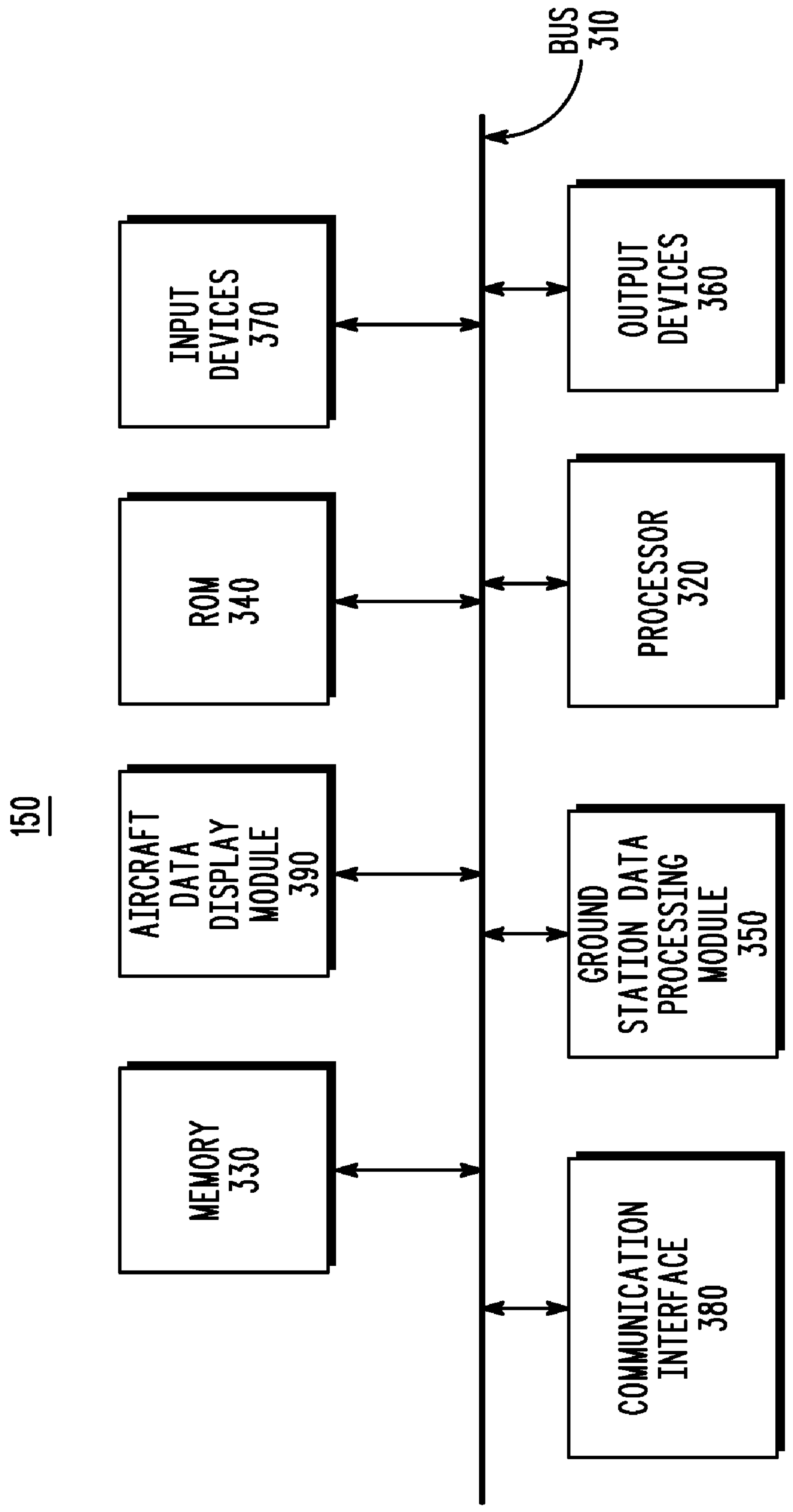
FIG. 3 is an exemplary block diagram of an aircraft data server in accordance with a possible embodiment of the disclosure.

FIG. 3 illustrates an exemplary block diagram of the aircraft data server 150 in accordance with a possible embodiment of the disclosure. The aircraft data server 150 may include bus 310, processor 320, memory 330, read only memory (ROM 340, ground station data processing module 350, output devices 360, input devices 370, communication interface 380, and aircraft data display module 390.

Bus 310 may permit communication among the components of the aircraft data server 150. Processor 320 may include at least one conventional processor or microprocessor that interprets and executes instructions. Memory 330 may be a random access memory (RAM or another type of dynamic storage device that stores information and instructions for execution by processor 320.

Communication interface 380 may include any mechanism that facilitates communication via the communications network 110. For example, communication interface 380 may include a modem. Alternatively, communication interface 380 may include other mechanisms for assisting in communications with other devices and/or systems.

ROM 340 may include a conventional ROM device or another type of static storage device that stores static information and instructions for processor 320. A storage device may augment the ROM 340 and may include any type of storage media, such as, for example, magnetic or optical recording media and its corresponding drive.

Input devices 360 may include one or more conventional mechanisms that permit a user to input information to the aircraft data server 150, such as a keyboard, a mouse, a pen, a voice recognition device, touchpad, buttons, etc. Output devices 370 may include one or more conventional mechanisms that output information to the user, including a display, a printer, a copier, a scanner, a multi-function device, one or more speakers, or a medium, such as a memory, or a magnetic or optical disk and a corresponding disk drive.

The aircraft data server 150 may perform such functions in response to processor 320 by executing sequences of instructions contained in a computer-readable medium, such as, for example, memory 330. Such instructions may be read into memory 330 from another computer-readable medium, such as a storage device or from a separate device via communication interface 380.

For illustrative purposes, the functions of the ground station data processing module 350, the aircraft data display module 295 and the aircraft data processing process may be described below in FIG. 5 in relation to the diagrams shown in FIGS. 1 and 3.

Figure 4:
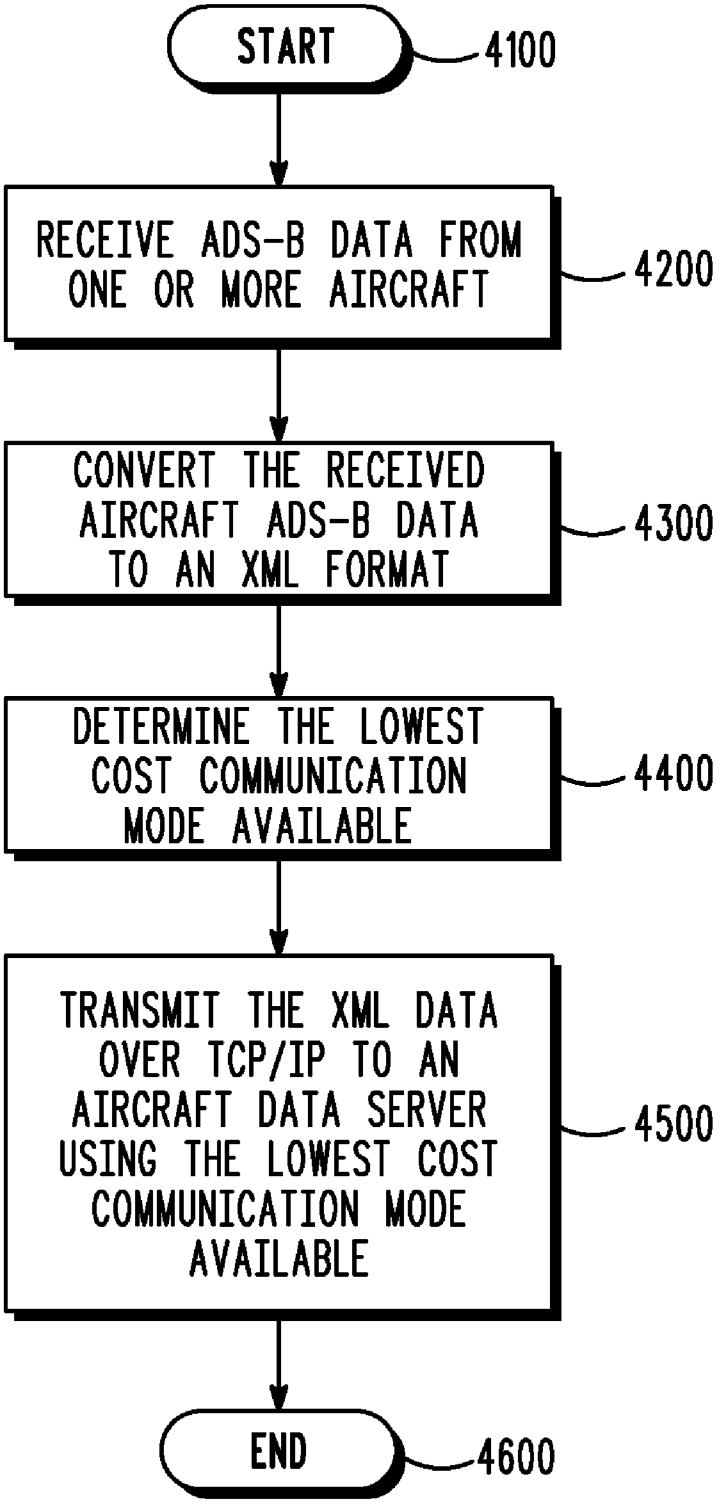
FIG. 4 is an exemplary flowchart of an aircraft data collection process in accordance with a possible embodiment of the disclosure.

FIG. 4 illustrates an exemplary flowchart of the aircraft data collection process in accordance with a possible embodiment of the disclosure. The process begins at step 4100 and goes to step 4200, where the ADS-B receiver 290 may receive ADS-B data from one or more aircraft 120. The ADS-B receiver 290 may receive ADS-B communications on an ADS-B frequency, such as 1090 MHz and 978 MHz. The aircraft data may include aircraft data communicated by ADS-B systems, such as date and time, call sign, latitude, longitude, altitude, airspeed, status, registration number, vertical rate, track, ground speed, or transponder mode and code.

At step 4300, an aircraft data processing module 250 may convert the received aircraft ADS-B data to XML format for transmission over TCP/IP. At step 4400, the aircraft data processing module 250 may determine the lowest cost communication mode available. The aircraft data processing module 250 may determine the lowest cost available communication mode from the Internet, private network, cellular data network, and satellite network based on operability, availability, bandwidth available, and/or expense. For example, during configuration, two communication methods are provisioned: TCP/IP over a BGAN satellite connection and TCP/IP over a 3G cellular connection. The satellite connection has an associated cost of $12 USD per Megabyte of data transferred, while the 3G cellular connection has an associated cost of $1 USD per Megabyte. The aircraft data processing module 250 uses the lowest cost communication method (3G cellular) until it is not available, then it continues operation using the more expensive satellite connection. The least cost routing function could be used across any number of connections using any combination of network types.

At step 4500, the aircraft data processing module 250 may transmit the XML data over TCP/IP to an aircraft data server 150 through the communication interface 270. The aircraft data processing module 250 may also transmit a status report indicating that the ground station is operating at periodic or random intervals, or when queried, for example. The process may go to step 4600 and end.

Figure 5:
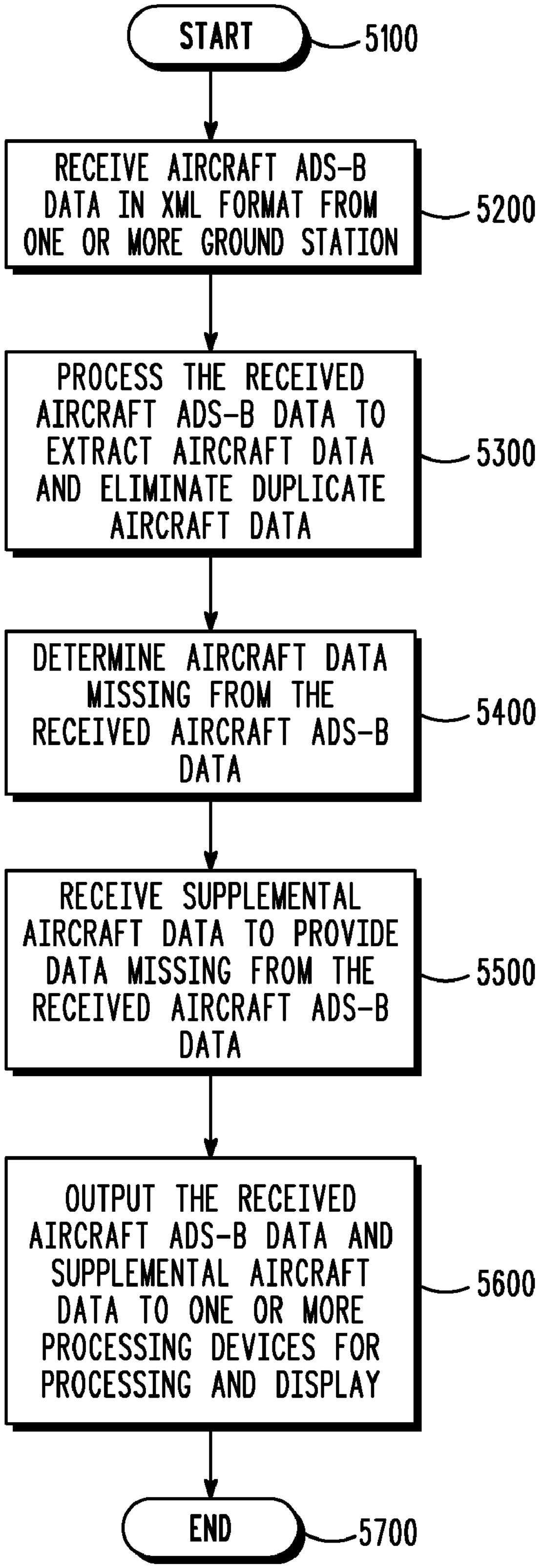
FIG. 5 is an exemplary flowchart of an aircraft data processing process in accordance with a possible embodiment of the disclosure.

FIG. 5 illustrates an exemplary flowchart of the aircraft data processing process in accordance with a possible embodiment of the disclosure. The process begins at step 5100 and goes to step 5200, where the ground station data processing module 350 may receive aircraft ADS-B data in XML format over TCP/IP from one or more ground stations 1130, 140 through the communication interface 380. At step 5300, the ground station data processing module 350 may process the received ADS-B data to extract aircraft data and eliminate duplicate aircraft data.

At step 5400, the ground station data processing module 350 may determine aircraft data missing from the processed aircraft data. At step 5500, the ground station data processing module 350 may receive supplemental aircraft data from other sources to provide aircraft data missing from the processed aircraft data through the communication interface 380. The additional supplemental aircraft data may include weather information, airport information, NOTAMS, AIRMETS, aircraft type or flight plan data.

At step 5600, the ground station data processing module 350 may output the processed aircraft data and the received supplemental aircraft data to one or more processing devices 160 for processing and display through the communication interface 380. The process may then go to step 5700 and end.

An aircraft data display module 390 may also convert the aircraft data into a graphical and tabular format and transmit that graphical and tabular formatted data to other terminals for display to users. The ground station data processing module 350 may also store the processed aircraft data in the historical aircraft database located in memory 330, for example.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the disclosed system each processing the content in various possible ways. It does not necessarily need to be one system used by all end users. Accordingly, the appended claims and their legal equivalents should only define the disclosure, rather than any specific examples given.

We claim:

1. A method of receiving data from one or more aircraft at a ground station, comprising:

receiving ADS-B data from one or more aircraft using a communications receiver, the communications receiver receiving communications from at least one of 1090 MHz and 978 MHz frequencies;

converting the received aircraft ADS-B data to XML format;

determining the lowest cost communication mode available, wherein the lowest cost available communication mode is determined from one of the Internet, private network, cellular data network, and satellite network and is determined based on at least one of operability, availability, bandwidth available, and expense; and transmitting the XML data over TCP/IP to an aircraft data server through a communication interface using the lowest cost communication mode available.

2. The method of claim 1, wherein the ground station is portable.

3. The method of claim 1, wherein the aircraft data is at least one of date and time, call sign, latitude, longitude, altitude, airspeed, status, registration number, vertical rate, track, ground speed, and transponder mode and code.

4. The method of claim 1, further comprising:

transmitting a status report indicating that the ground station is operating.

5. A ground station that receives data from one or more aircraft, comprising:

a communication interface that facilitates communications through one or more communications networks;

a communications receiver that receives ADS-B data from one or more aircraft, the communications receiver receiving communications from at least one of 1090 MHz and 978 MHz frequencies; and an aircraft data processing module that converts the received aircraft ADS-B data to XML format, determines the lowest cost communication mode available, and transmits the XML data over TCP/IP to an aircraft data server through the communication interface using the lowest cost communication mode available, wherein the aircraft data processing module determines the lowest cost available communication mode from one of the Internet, private network, cellular data network, and satellite network based on at least one of operability, availability, bandwidth available, and expense.

6. The ground station of claim 5, wherein the ground station is portable.

7. The ground station of claim 5, wherein the aircraft data is at least one of date and time, call sign, latitude, longitude, altitude, airspeed, status, registration number, vertical rate, track, ground speed, and transponder mode and code.

8. The ground station of claim 5, wherein aircraft data processing module transmits a status report indicating that the ground station is operating.

9. A method of receiving and processing aircraft ADS-B data from one or more ground stations using an aircraft data server, comprising:

receiving aircraft ADS-B data in XML format from one or more ground stations through a communication interface;

processing the received ADS-B data to extract aircraft data and eliminate duplicate aircraft data;

determining aircraft data missing from the processed aircraft data;

receiving supplemental aircraft data from other sources to provide aircraft data missing from the processed aircraft data through the communication interface; and outputting the processed aircraft data and the received supplemental aircraft data to one or more processing devices for processing and display through the communication interface.

10. The method of claim 9, wherein the aircraft data is converted into a graphical and tabular format and is transmitted to other terminals for display to users.

11. The method of claim 9, further comprising:

receiving additional supplemental aircraft data from other sources, the additional supplemental aircraft data including at least one of weather information, airport information, NOTAMS, AIRMETS, aircraft type and flight plan; and outputting the received additional supplemental aircraft data along with the processed aircraft data and received supplemental aircraft data for processing and display.

12. The method of claim 9, further comprising:

storing the aircraft data in an historical aircraft database.

13. The method of claim 9, wherein the method is performed by one of a server, a computer, a personal computer, a portable computer, and a personal digital assistant.

14. An aircraft data server that receives and processes aircraft ADS-B data from one or more ground stations, comprising:

a communication interface that facilitates communications through one or more communications networks;

a ground station data processing module that receives aircraft ADS-B data in XML format from one or more ground stations through the communication interface, processes the received ADS-B data to extract aircraft data and eliminate duplicate aircraft data; determines aircraft data missing from the processed aircraft data, receives supplemental aircraft data from other sources to provide aircraft data missing from the processed aircraft data through the communication interface, and outputs the processed aircraft data and the received supplemental aircraft data to one or more processing devices for processing and display through the communication interface.

15. The aircraft data server of claim 14, further comprising:

an aircraft data display module that converts the aircraft data into a graphical and tabular format and transmits that graphical and tabular formatted data to other terminals for display to users.

16. The aircraft data server of claim 14, wherein the ground station data processing module receives additional supplemental aircraft data from other sources, the additional supplemental aircraft data including at least one of weather information, airport information, NOTAMS, AIRMETS, aircraft type and flight plan, and outputs the received additional supplemental aircraft data along with the processed aircraft data and received supplemental aircraft data for processing and display.

17. The aircraft data server of claim 14, further comprising:

a memory; and a historical aircraft database located in the memory, wherein the ground station data processing module stores the aircraft data in the historical aircraft database.

18. The aircraft data server of claim 14, wherein the aircraft data server is one of a server, a computer, a personal computer, a portable computer, and a personal digital assistant.

19. A system that receives and processes ADS-B data from one or more aircraft, comprising:

one or more ground stations that receives data from one or more aircraft, comprising:

a ground station communication interface that facilitates communications through one or more communications networks;

a communications receiver that receives ADS-B data from one or more aircraft, the communications receiver receiving communications from at least one of 1090 MHz and 978 MHz frequencies; and an aircraft data processing module that converts the received aircraft ADS-B data to XML format, determines the lowest cost communication mode available, and transmits the XML data to an aircraft data server through the ground station communication interface using the lowest cost communication mode available, wherein the aircraft data processing module determines the lowest cost available communication mode from one of the Internet, private network, cellular data network, and satellite network based on at least one of operability, availability, bandwidth available, and expense; and an aircraft data server that receives and processes aircraft ADS-B data from the one or more ground stations, comprising:

an aircraft data server communication interface that facilitates communications through one or more communications networks;

a ground station data processing module that receives aircraft ADS-B data in XML format from the one or more ground stations through the communication interface, processes the received ADS-B data to extract aircraft data and eliminate duplicate aircraft data; determines aircraft data missing from the processed aircraft data, receives supplemental aircraft data from other sources to provide aircraft data missing from the processed aircraft data through the aircraft data server communication interface, and outputs the processed aircraft data and the received supplemental aircraft data to one or more processing devices for processing and display through the aircraft data server communication interface.

20. The system of claim 19, wherein the aircraft data server is one of a server, a computer, a personal computer, a portable computer, and a personal digital assistant.

* * * * *